(12) United States Patent
Sugahara

(10) Patent No.: US 11,472,081 B2
(45) Date of Patent: Oct. 18, 2022

(54) DRIVE MECHANISM FOR INJECTION MOLDING MACHINE

(71) Applicant: FANUC CORPORATION, Minamitsuru-gun (JP)

(72) Inventor: Keisuke Sugahara, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 222 days.

(21) Appl. No.: 16/929,608

(22) Filed: Jul. 15, 2020

(65) Prior Publication Data
US 2021/0016480 A1 Jan. 21, 2021

(30) Foreign Application Priority Data
Jul. 19, 2019 (JP) .............................. JP2019-133693

(51) Int. Cl.
*B29C 45/50* (2006.01)
*B29C 45/66* (2006.01)
*F16H 7/02* (2006.01)
*F16H 7/00* (2006.01)

(52) U.S. Cl.
CPC ........ *B29C 45/5008* (2013.01); *B29C 45/661* (2013.01); *F16H 7/00* (2013.01); *F16H 7/02* (2013.01); *F16H 7/023* (2013.01); *B29C 2045/504* (2013.01)

(58) Field of Classification Search
CPC ......... F16H 7/06; F16H 7/02; B29C 45/1761; B29C 45/5008
USPC .......................................................... 474/84
See application file for complete search history.

(56) References Cited

U.S. PATENT DOCUMENTS

| 53,717 | A | * | 4/1866 | Whelpley | F16H 7/06 474/84 |
| 112,103 | A | * | 2/1871 | Wilcock et al. | F16H 9/08 474/84 |
| 119,674 | A | * | 10/1871 | Weaver | F16H 7/06 474/84 |
| 173,260 | A | * | 2/1876 | Bowen | F16H 7/06 474/84 |
| 175,529 | A | * | 3/1876 | Underwood | F16H 7/02 474/84 |
| 241,494 | A | * | 5/1881 | Jarolimek | F16H 7/06 474/84 |
| 452,848 | A | * | 5/1891 | Moorhouse et al. | F16H 7/06 474/122 |
| 469,491 | A | * | 2/1892 | Walker | F16H 7/06 474/84 |

(Continued)

FOREIGN PATENT DOCUMENTS

| JP | 2004-169809 A | 6/2004 |
| JP | 2016-036262 A | 3/2016 |
| JP | 2019-018505 A | 2/2019 |

*Primary Examiner* — Henry Y Liu
(74) *Attorney, Agent, or Firm* — McGinn I.P. Law Group, PLLC.

(57) ABSTRACT

A drive mechanism for an injection molding machine that causes a movable object to undergo movement includes a driving motor that generates a driving force, a drive pulley connected to the driving motor, a driven pulley connected to the movable object, and a plurality of belts (a wide belt and a narrow belt) of equal length, the belts being arranged in parallel with each other and trained around the drive pulley and the driven pulley.

14 Claims, 4 Drawing Sheets

(56) References Cited

U.S. PATENT DOCUMENTS

| | | | | |
|---|---|---|---|---|
| 594,622 | A * | 11/1897 | Harton | F16H 9/08 474/84 |
| 645,797 | A * | 3/1900 | Eshelman, Jr. | D05B 69/12 474/84 |
| 676,797 | A * | 6/1901 | Miller | F16H 7/06 474/84 |
| 687,146 | A * | 11/1901 | Fleckenstein | F16H 27/04 474/84 |
| 954,789 | A * | 4/1910 | Edison | F16H 7/06 474/84 |
| 1,031,106 | A * | 7/1912 | Camp | F16H 55/566 474/84 |
| 1,072,834 | A * | 9/1913 | Devlin | F16H 9/26 475/182 |
| 1,662,511 | A * | 3/1928 | Geist | F16H 7/02 24/39 |
| 1,694,652 | A * | 12/1928 | Hager | B61C 9/00 474/84 |
| 1,792,733 | A * | 2/1931 | De Wein | F16H 55/49 474/178 |
| 1,828,136 | A * | 10/1931 | Freedlander | F16H 55/38 24/39 |
| 2,006,614 | A * | 7/1935 | Wuesthoff | B61D 43/00 474/84 |
| 2,082,540 | A * | 6/1937 | Randolph | F16H 7/02 474/84 |
| 2,425,785 | A * | 8/1947 | Geare | F16H 7/24 474/84 |
| 2,753,812 | A * | 7/1956 | Wharton | B61D 43/00 474/134 |
| 2,776,746 | A * | 1/1957 | Envoldsen | B07B 13/065 474/84 |
| 2,792,723 | A * | 5/1957 | Ottomar | B23Q 5/00 474/84 |
| 2,910,889 | A * | 11/1959 | Lackey | F16H 37/00 474/84 |
| 2,920,494 | A * | 1/1960 | Dodwell | F16H 7/06 474/84 |
| 3,029,654 | A * | 4/1962 | Hill | F16H 55/30 474/84 |
| 3,164,027 | A * | 1/1965 | Rood, Jr. | F16H 7/14 474/84 |
| 3,325,026 | A * | 6/1967 | Benedick | B23K 37/0538 474/139 |
| 3,396,988 | A * | 8/1968 | Kroening | F16H 7/06 474/84 |
| 3,534,634 | A * | 10/1970 | Shunpei | F16H 7/14 474/84 |
| 4,091,541 | A * | 5/1978 | DiCiaccio | G01D 5/04 33/711 |
| 4,173,154 | A * | 11/1979 | Sawmiller | B62M 3/06 474/84 |
| 4,293,295 | A * | 10/1981 | van Deuren | B30B 11/201 425/314 |
| 4,294,548 | A * | 10/1981 | Watson | B28C 5/1887 474/84 |
| 5,196,213 | A * | 3/1993 | Watanabe | B29C 45/4005 425/444 |
| 5,378,141 | A * | 1/1995 | Aoki | B29C 45/66 425/589 |
| 5,749,800 | A * | 5/1998 | Nagel | F16H 19/005 474/84 |
| 5,813,934 | A * | 9/1998 | Patton | F16H 7/06 474/84 |
| 7,867,119 | B2 * | 1/2011 | Brunetiere | B60K 6/485 474/84 |
| 9,017,194 | B2 * | 4/2015 | Richardson | F16H 37/065 474/84 |
| 9,493,306 | B2 * | 11/2016 | Niewmierzycki | H01L 21/68707 |
| 2006/0292257 | A1 * | 12/2006 | Nishimura | B29C 45/5008 425/149 |
| 2007/0015617 | A1 * | 1/2007 | Bertolotti | F03D 9/28 474/85 |
| 2011/0319208 | A1 * | 12/2011 | Morrow | F16H 7/023 474/84 |
| 2013/0055858 | A1 * | 3/2013 | Richardson | E21B 19/164 474/148 |
| 2013/0059690 | A1 * | 3/2013 | Di Cesare | F16G 1/28 474/205 |
| 2013/0330436 | A1 * | 12/2013 | Kuroda | B29C 45/07 425/589 |
| 2014/0151195 | A1 * | 6/2014 | Niewmierzycki | H01L 21/67766 198/813 |
| 2018/0361638 | A1 * | 12/2018 | Yang | B29C 45/162 |
| 2019/0022909 | A1 | 1/2019 | Nishimura et al. | |
| 2020/0049230 | A1 * | 2/2020 | Suzuki | F16G 1/06 |

\* cited by examiner

DRIVE MECHANISM FOR INJECTION MOLDING MACHINE

CROSS-REFERENCE TO RELATED APPLICATION

This application is based upon and claims the benefit of priority from Japanese Patent Application No. 2019-133693 filed on Jul. 19, 2019, the contents of which are incorporated herein by reference.

BACKGROUND OF THE INVENTION

Field of the Invention

The present invention relates to a drive mechanism for an injection molding machine that causes a movable object to move.

Description of the Related Art

In Japanese Laid-Open Patent Publication No. 2019-018505, an injection molding machine is disclosed that includes a mold clamping device and an injection device. The mold clamping device includes two drive mechanisms, and more specifically, a drive mechanism concerned with opening and closing operations of a mold, and a drive mechanism concerned with an ejecting operation for the molded product. The injection device also includes two drive mechanisms, and more specifically, a drive mechanism concerned with an operation of supplying a resin material, and a drive mechanism concerned with an operation of injecting the resin material from a nozzle into the mold. Each of the drive mechanisms transmits power generated by a driving motor to a movable object via a drive pulley, a belt, and a driven pulley. The injection molding machine continuously manufactures molded products by operating the drive mechanisms in synchronism with each other.

SUMMARY OF THE INVENTION

In any one of the drive mechanisms of the injection molding machine, if the tension of the belt that is trained around the drive pulley and the driven pulley decreases, floating (disengaging) or slippage of the belt occurs, and there is a concern that power may temporarily cease to be transmitted from the drive pulley to the driven pulley. In such a case, since a deviation occurs in one of the operations of the injection molding machine, it becomes necessary to stop the operations of the injection molding machine. In order to prevent the injection molding machine from being stopped, it is desirable to prevent floating or slippage of the belts.

Thus, it is an object of the present invention to provide a drive mechanism for an injection molding machine, which is capable of preventing a deviation in operation due to floating (disengaging) or slippage of a belt.

An aspect of the present invention is characterized by a drive mechanism for an injection molding machine configured to cause a movable object to undergo movement, the drive mechanism including a driving motor configured to generate a driving force, a drive pulley connected to the driving motor, a driven pulley connected to the movable object, and a plurality of belts having equal lengths, the belts being arranged in parallel with each other and trained around the drive pulley and the driven pulley.

According to the present invention, a deviation in operation due to floating or slippage of the belts is less likely to occur. Accordingly, a deviation in the plurality of operations performed by the injection molding machine is less likely to occur.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
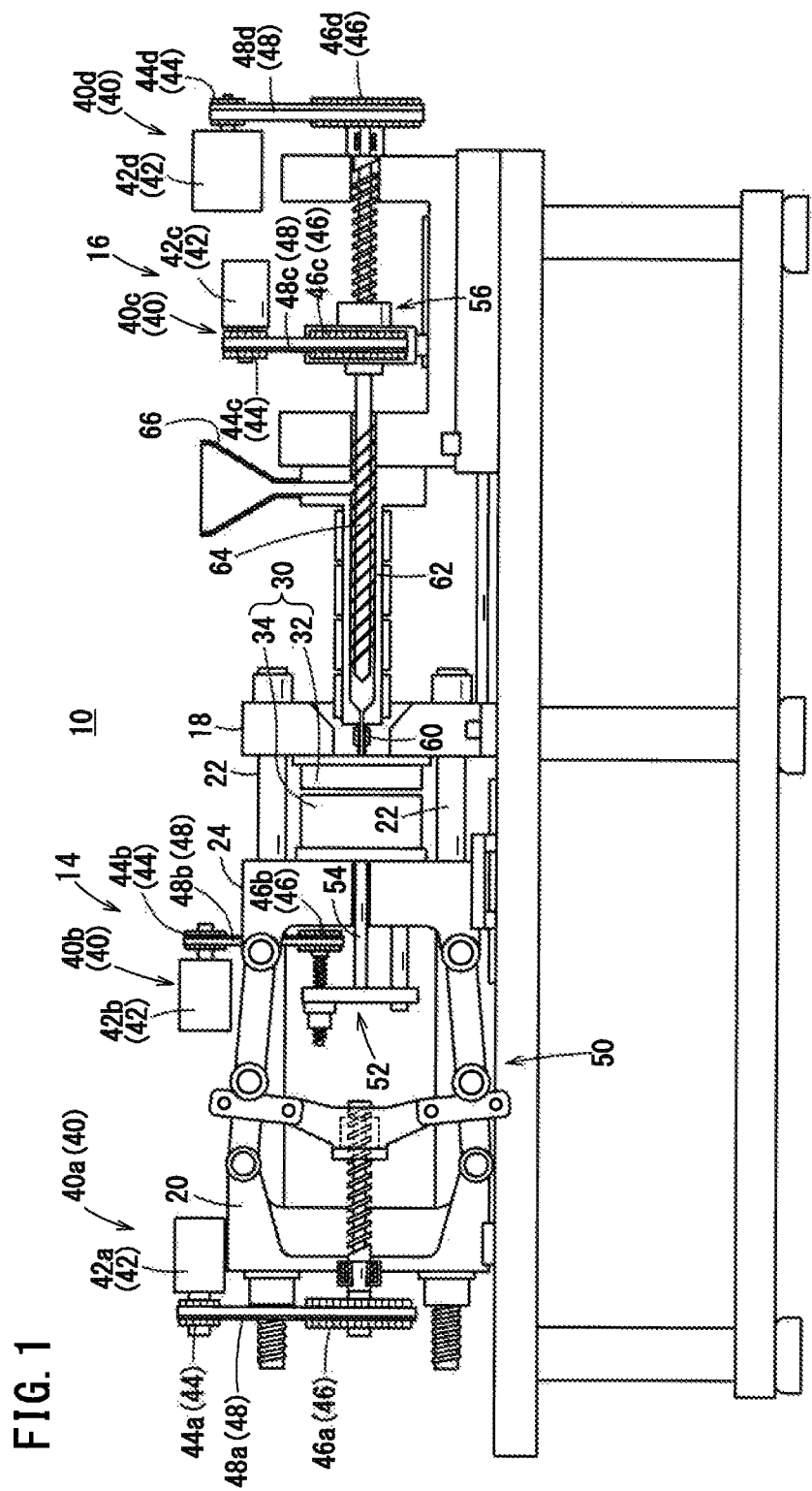
FIG. 1 is a schematic diagram showing a configuration of an injection molding machine as viewed from the side.

A preferred embodiment of a drive mechanism for an injection molding machine according to the present invention will be presented and described in detail below with reference to the accompanying drawings.

[1. Configuration of Injection Molding Machine]

An outline of the configuration of an injection molding machine 10 will be described with reference to FIG. 1. The injection molding machine 10 includes a mold clamping device 14, and an injection device 16.

The mold clamping device 14 includes a stationary platen 18, a rear platen 20, a plurality of tie bars 22, and a movable platen 24. The plurality of tie bars 22 connect the stationary platen 18 and the rear platen 20, and furthermore, serve to guide the movable platen 24 that moves between the stationary platen 18 and the rear platen 20. A fixed mold 32 is attached to the stationary platen 18, and a movable mold 34 is attached to the movable platen 24. A mold 30 is constituted by the fixed mold 32 and the movable mold 34.

The mold clamping device 14 includes a mold opening and closing mechanism 40a that carries out opening and closing operations of the mold 30. The mold opening and closing mechanism 40a corresponds to a drive mechanism 40 of the injection molding machine 10. The mold opening and closing mechanism 40a includes a first motor 42a, a first drive pulley 44a, a first driven pulley 46a, a plurality of first belts 48a, and a first power transmission mechanism 50. A driving force generated by rotation of the first motor 42a is transmitted to the first power transmission mechanism 50 via the first drive pulley 44a, the plurality of first belts 48a, and the first driven pulley 46a. The first power transmission mechanism 50 transmits the driving force to the movable platen 24 via a ball screw mechanism and a link mechanism, etc., and causes the movable platen 24 to move linearly in a mold closing direction or in a mold opening direction.

The mold clamping device 14 has an ejector mechanism 40b for carrying out an ejecting operation for a molded product from the movable mold 34. The ejector mechanism 40b corresponds to a drive mechanism 40 of the injection molding machine 10. The ejector mechanism 40b includes a second motor 42b, a second drive pulley 44b, a second driven pulley 46b, a plurality of second belts 48b, and a second power transmission mechanism 52. A driving force generated by rotation of the second motor 42b is transmitted to the second power transmission mechanism 52 via the second drive pulley 44b, the plurality of second belts 48b, and the second driven pulley 46b. The second power transmission mechanism 52 transmits the driving force to an ejector pin 54 via a ball screw mechanism or the like, and causes the ejector pin 54 to move linearly in a direction to be pushed out or in a direction to be pulled in.

The injection device 16 includes a nozzle 60, a cylinder 62, a screw 64, and a hopper 66. The nozzle 60 is disposed at a distal end of the cylinder 62. The cylinder 62 is a hollow member. The screw 64 is inserted through the interior of the cylinder 62. The cylinder 62 and the screw 64 extend along the opening and closing directions of the mold 30. The hopper 66 is disposed upwardly of the cylinder 62. The hopper 66 communicates with the interior of the cylinder 62, and supplies a resin material to the interior of the cylinder 62 in accordance with a rotating operation of the screw 64.

The injection device 16 includes a screw rotation mechanism 40c that carries out an operation of supplying the resin material to the interior of the cylinder 62. The screw rotation mechanism 40c corresponds to a drive mechanism 40 of the injection molding machine 10. The screw rotation mechanism 40c includes a third motor 42c, a third drive pulley 44c, a third driven pulley 46c, and a plurality of third belts 48c. A driving force generated by rotation of the third motor 42c is transmitted to the screw 64 via the third drive pulley 44c, the plurality of third belts 48c, and the third driven pulley 46c. As a result, the screw 64 is rotated.

The injection device 16 includes an injection mechanism 40d that carries out an operation of injecting the resin material. The injection mechanism 40d corresponds to a drive mechanism 40 of the injection molding machine 10. The injection mechanism 40d includes a fourth motor 42d, a fourth drive pulley 44d, a fourth driven pulley 46d, a plurality of fourth belts 48d, and a fourth power transmission mechanism 56. A driving force generated by rotation of the fourth motor 42d is transmitted to the fourth power transmission mechanism 56 via the fourth drive pulley 44d, the plurality of fourth belts 48d, and the fourth driven pulley 46d. The fourth power transmission mechanism 56 transmits the driving force to the screw 64 via a ball screw mechanism or the like, and causes the screw 64 to move linearly in a direction toward the nozzle 60 or in an opposite direction away from the nozzle 60.

The mold opening and closing mechanism 40a, the ejector mechanism 40b, the screw rotation mechanism 40c, and the injection mechanism 40d are operated synchronously with the same period.

[2. Configuration of Drive Mechanisms 40]

The mold opening and closing mechanism 40a, the ejector mechanism 40b, the screw rotation mechanism 40c, and the injection mechanism 40d shown in FIG. 1 function as the drive mechanisms 40. The configuration of each of the drive mechanisms 40 will be described in detail with reference to FIGS. 2 and 3.

The drive mechanism 40 includes a driving motor 42 that generates a driving force, a drive pulley 44 connected to the driving motor 42, a driven pulley 46 connected to a movable object, and two belts 48 that are trained around the drive pulley 44 and the driven pulley 46.

In the case that the drive mechanism 40 is the mold opening and closing mechanism 40a shown in FIG. 1, the driving motor 42 is the first motor 42a, the drive pulley 44 is the first drive pulley 44a, the driven pulley 46 is the first driven pulley 46a, the two belts 48 are the plurality of first belts 48a, and the movable object is the movable platen 24.

In the case that the drive mechanism 40 is the ejector mechanism 40b shown in FIG. 1, the driving motor 42 is the second motor 42b, the drive pulley 44 is the second drive pulley 44b, the driven pulley 46 is the second driven pulley 46b, the two belts 48 are the plurality of second belts 48b, and the movable object is the ejector pin 54.

In the case that the drive mechanism 40 is the screw rotation mechanism 40c shown in FIG. 1, the driving motor 42 is the third motor 42c, the drive pulley 44 is the third drive pulley 44c, the driven pulley 46 is the third driven pulley 46c, the two belts 48 are the plurality of third belts 48c, and the movable object is the screw 64.

In the case that the drive mechanism 40 is the injection mechanism 40d shown in FIG. 1, the driving motor 42 is the fourth motor 42d, the drive pulley 44 is the fourth drive pulley 44d, the driven pulley 46 is the fourth driven pulley 46d, the two belts 48 are the plurality of fourth belts 48d, and the movable object is the screw 64.

Figure 2:
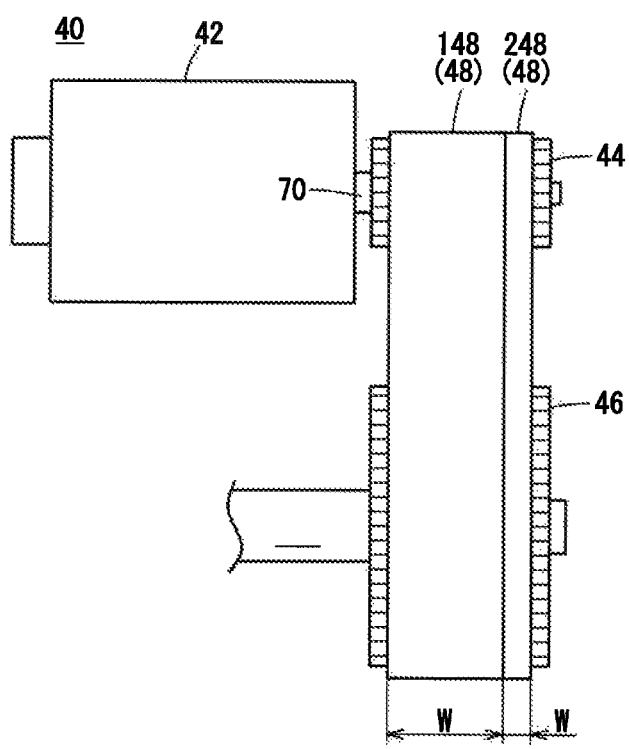
FIG. 2 is a schematic diagram showing a configuration of a drive mechanism as viewed from the side.

As shown in FIG. 2, according to the present embodiment, one of the two belts 48 is a wide belt 148 having a relatively wide width W, and the other is a narrow belt 248 having a relatively narrow width W. The wide belt 148 and the narrow belt 248 have the same length as each other, and are arranged in parallel with each other. In the present specification, the term "relatively" implies a comparative relationship between the plurality of belts 48 which are arranged in parallel with each other.

In the drive mechanism 40 shown in FIG. 2, the drive pulley 44 is attached to a rotating shaft 70 of the driving motor 42. One end of the rotating shaft 70 is supported in the interior of the driving motor 42, and the other end is a free end. That is, the support structure of the drive pulley 44 that is attached to the rotating shaft 70 is a cantilevered structure. In the drive pulley 44 having such a cantilevered structure, the tension generated in the belts 48 increases as the belts 48 become closer to the support position (in the case of the present embodiment, the driving motor 42), and the tension generated in the belts 48 decreases as the belts 48 become more distanced from the support position. For this reason, the further away the belts 48 are from the support position, the more likely it is for floating (disengaging) or slippage of the belts 48 to occur. Further, the strength of the wide belt 148 is high, whereas the strength of the narrow belt 248 is low. According to the present embodiment, in order that the narrow belt 248 is subjected to damage before the wide belt 148, the wide belt 148 is arranged at a position relatively close to the driving motor 42, whereas the narrow belt 248 is arranged at a position relatively far away from the driving motor 42.

Figure 3:
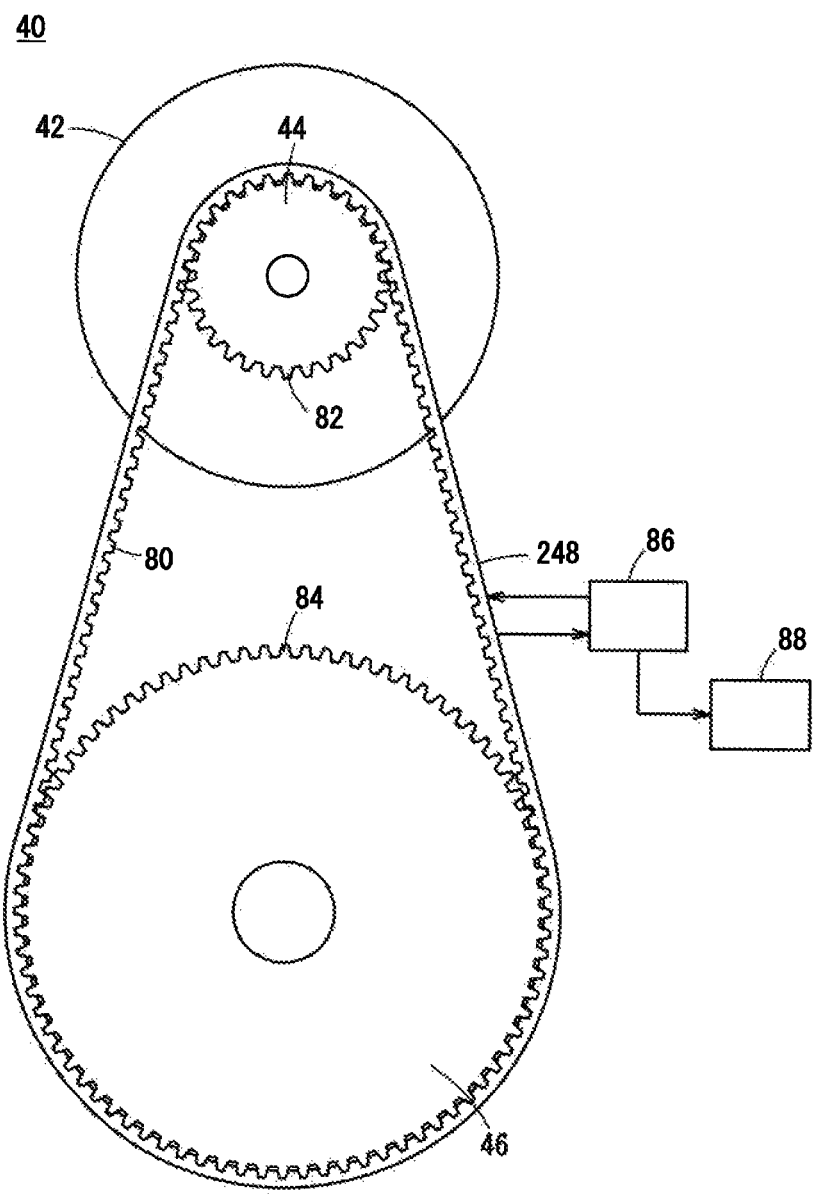
FIG. 3 is a schematic diagram showing a configuration of the drive mechanism as viewed from the front.
Figure 4:
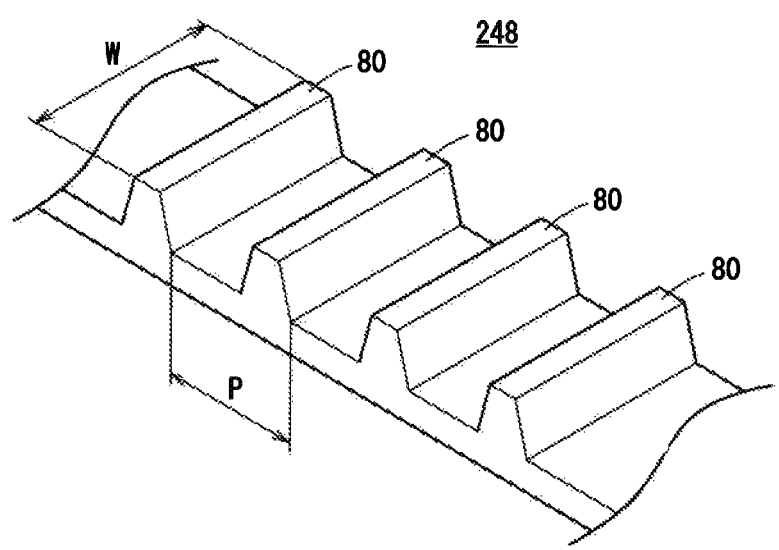
FIG. 4 is a schematic diagram showing a configuration of a narrow belt.

As shown in FIG. 3, the drive pulley 44 is a toothed pulley having drive pulley teeth 82 arranged at regular intervals along a circumferential direction thereof. Similarly, the driven pulley 46 is a toothed pulley having driven pulley teeth 84 arranged at regular intervals along a circumferential direction thereof. The narrow belt 248 is a synchronous power transmission belt having belt teeth 80 arranged at regular intervals along a lengthwise direction thereof. Although not shown in FIG. 3, the wide belt 148 is also a synchronous power transmission belt. As shown in FIG. 4, the width W of the narrow belt 248 is greater than or equal to a pitch P of the belt teeth 80. Furthermore, the width W of the narrow belt 248 is less than (a sum total value of the widths W of all of the belts 48/the number of the belts 48).

The narrow belt 248 is relatively inferior in strength. Therefore, as shown in FIG. 3, a non-contact type displacement sensor 86 is disposed in close proximity to the narrow belt 248. For example, in the case that the displacement sensor 86 uses laser light, the laser light is irradiated onto the narrow belt 248 at a position between the drive pulley 44 and the driven pulley 46. The displacement sensor 86 detects whether or not the narrow belt 248 exists between the drive pulley 44 and the driven pulley 46. The detection result of the displacement sensor 86 is output to a monitoring device 88. The monitoring device 88 has a computation device such as a processor or the like, and a user interface such as a monitor and a speaker. In the case that the narrow belt 248 becomes severed and has fallen off from the drive pulley 44 and the driven pulley 46, then on the basis of the detection result of the displacement sensor 86, the monitoring device 88 detects that the narrow belt 248 does not exist, and issues a notification to the user.

[3. Modifications]

In the above-described embodiment, although a description has been given of the drive mechanism 40 in which the two belts 48 are trained around the drive pulley 44 and the driven pulley 46, the number of the belts 48 is not necessarily limited to two. Three or more of the belts 48 may be trained around the drive pulley 44 and the driven pulley 46. Further, in the case that the three or more belts 48 have different widths W respectively, it is preferable that the belts 48 be arranged in a manner so that the widths W of the belts 48 become narrower as the belts 48 are more distanced from the driving motor 42.

In the above-described embodiment, although a description has been given of the drive mechanism 40 having the belts 48 whose widths W differ from each other, the widths W of the plurality of belts 48 may be equal to each other.

In the above-described embodiment, although a description has been given of the drive mechanism 40 having a single drive pulley 44 and a single driven pulley 46, a plurality of driven pulleys 46 may be used. In this case, a plurality of belts 48 are individually trained around one drive pulley 44 and each of the driven pulleys 46.

The plurality of belts 48 may be friction transmission belts instead of synchronous power transmission belts.

The drive mechanism 40 of the above-described embodiment has a cantilevered structure, in which one end of the rotating shaft 70 is supported in the interior of the driving motor 42, and the other end is a free end. Instead of such a cantilevered structure, the drive mechanism 40 may have a double-sided support structure, in which one end of the rotating shaft 70 is supported in the interior of the driving motor 42, and the other end is supported by a bearing or the like.

[4. Inventions that can be Obtained from the Embodiment]

Inventions that can be grasped from the above-described embodiment and the modifications thereof will be described below.

An aspect of the present invention is characterized by the drive mechanism 40 for the injection molding machine 10 configured to cause the movable object to undergo movement, including the driving motor 42 configured to generate the driving force, the drive pulley 44 connected to the driving motor 42, the driven pulley 46 connected to the movable object, and the plurality of belts 48 (the wide belt 148 and the narrow belt 248) having equal length, the belts being arranged in parallel with each other and trained around the drive pulley 44 and the driven pulley 46.

According to the above-described configuration, even if floating or slippage occurs in one of the belts 48, since the remaining belt 48 transmits power from the drive pulley 44 to the driven pulley 46, a deviation in operation due to floating or slippage of the belts 48 is less likely to occur. Accordingly, a deviation in the plurality of operations performed by the injection molding machine 10 is less likely to occur.

In the aspect of the present invention, at least one of the belts 48 (the narrow belt 248) may have a width that differs from that of the other belt 48 (the wide belt 148).

In the aspect of the present invention, the belt 48 (the narrow belt 248) having the narrowest width may be disposed at a position farthest from the driving motor 42.

In accordance with the above-described configuration, since the narrow belt 248 is provided at a position where tension is the lowest, and namely, at a position that is farthest away from the driving motor 42, floating or slippage of the narrow belt 248 easily occurs. Further, the narrow belt 248 is inferior in strength in comparison with the other belt 48 (the wide belt 148 or the like). Accordingly, the narrow belt 248 is more easily subjected to damage than the other belt 48 that is arranged in close proximity to the driving motor 42. In the foregoing manner, the narrow belt 248 which is of low strength is arranged at the position where the belt 48 is likely to be subjected to damage, and the other belt 48 which is of high strength is arranged at the position where the belt 48 is less likely to become damaged, whereby it is possible to prevent the belts 48 from becoming damaged at the same time. Further, in accordance with the above-described configuration, by monitoring the narrow belt 248 for which the possibility is high that it will be subjected to damage before the other belt 48, prior to all of the belts 48 becoming damaged, it is possible to provide a notification that the belt 48 has become damaged. As a result, it is possible to prevent the mold 30 and the other components of the injection molding machine 10 from becoming damaged.

In the aspect of the present invention, there may further be included the sensor (the displacement sensor 86) configured to detect whether or not the belt 48 (the narrow belt 248) having the narrowest width exists between the drive pulley 44 and the driven pulley 46.

In accordance with the above-described configuration, it is possible to provide, to the user, a notification that the narrow belt 248 has fallen off.

In the aspect of the present invention, the drive pulley 44 and the driven pulley 46 may be toothed pulleys, and the plurality of belts 48 may be synchronous power transmission belts.

In the case that the belts 48 are synchronous power transmission belts, the following problem occurs, which does not exist in an injection molding machine 10 that uses a friction transmission belt. For example, when floating is generated in the belts 48, a case may occur in which the belt teeth 80 overcome (become disengaged from) the drive pulley teeth 82 or the driven pulley teeth 84. In such a case, there is a concern that not only the belt 48 but also other components of the injection molding machine 10 may be subjected to damage. In accordance with the above-described configuration, even if the belt teeth 80 overcome the drive pulley teeth 82 or the driven pulley teeth 84, the remaining belt 48 remains properly enmeshed with the drive pulley 44 and the driven pulley 46. Therefore, only the belt 48 for which the belt teeth 80 thereof have overcome the drive pulley teeth 82 or the driven pulley teeth 84 is subjected to damage, and thus it is possible to prevent the other components from being subjected to damage.

In the aspect of the present invention, the width W of the belt 48 (the narrow belt 248) having the narrowest width may be greater than or equal to the pitch P of the teeth (the belt teeth 80) provided on the belt 48 (the narrow belt 248).

The drive mechanism for the injection molding machine according to the present invention is not limited to the above-described embodiment and the modifications thereof, and it goes without saying that various additional or modified configurations could be adopted therein without departing from the essence and gist of the present invention.

What is claimed is:

1. A drive mechanism for an injection molding machine configured to cause a movable object to undergo movement, the drive mechanism comprising:
   a driving motor configured to generate a driving force;
   a drive pulley connected to the driving motor;
   a driven pulley connected to the movable object; and
   a plurality of belts, the belts being arranged in parallel with each other and trained around the drive pulley and the driven pulley,
   wherein at least one of the belts has a width that differs from that of another belt.

2. The drive mechanism for the injection molding machine according to claim 1, wherein a belt that has a narrowest width, among the plurality of belts, is disposed at a position farthest from the driving motor.

3. The drive mechanism for the injection molding machine according to claim 1, further comprising a sensor configured to detect whether or not a belt that has a narrowest width, among the plurality of belts, exists between the drive pulley and the driven pulley.

4. The drive mechanism for the injection molding machine according to claim 1, wherein the drive pulley and the driven pulley are toothed pulleys, and the plurality of belts are synchronous power transmission belts.

5. The drive mechanism for the injection molding machine according to claim 4, wherein a width of a belt that has a narrowest width, among the plurality of belts, is greater than or equal to a pitch of teeth provided on the belt.

6. The drive mechanism for the injection molding machine according to claim 2, further comprising a sensor configured to detect whether or not a belt that has a narrowest width, among the plurality of belts, exists between the drive pulley and the driven pulley.

7. The drive mechanism for the injection molding machine according to claim 2, wherein the drive pulley and the driven pulley are toothed pulleys, and the plurality of belts are synchronous power transmission belts.

8. The drive mechanism for the injection molding machine according to claim 3, wherein the drive pulley and the driven pulley are toothed pulleys, and the plurality of belts are synchronous power transmission belts.

9. The drive mechanism for the injection molding machine according to claim 6, wherein the drive pulley and the driven pulley are toothed pulleys, and the plurality of belts are synchronous power transmission belts.

10. The drive mechanism for the injection molding machine according to claim 7, wherein a width of a belt that has a narrowest width, among the plurality of belts, is greater than or equal to a pitch of teeth provided on the belt.

11. The drive mechanism for the injection molding machine according to claim 8, wherein a width of a belt that has a narrowest width, among the plurality of belts, is greater than or equal to a pitch of teeth provided on the belt.

12. The drive mechanism for the injection molding machine according to claim 9, wherein a width of a belt that has a narrowest width, among the plurality of belts, is greater than or equal to a pitch of teeth provided on the belt.

13. The drive mechanism for the injection molding machine according to claim 9, wherein the plurality of belts have equal lengths.

14. A drive mechanism for an injection molding machine configured to cause a movable object to undergo movement, the drive mechanism comprising:
   a driving motor configured to generate a driving force;
   a drive pulley connected to the driving motor;
   a driven pulley connected to the movable object; and
   a plurality of belts trained around the drive pulley and the driven pulley,
   wherein a width of at least one of the belts is less than a sum total value of widths of all of the plurality of belts divided by a total number of the plurality of belts.

* * * * *